Nov. 24, 1964 P. E. LANNAN 3,158,337
CONTROL SYSTEM FOR SPACE DEVICE
Filed May 28, 1959 4 Sheets-Sheet 1

INVENTOR.
PATRICK E. LANNAN
BY
ATT'Y

INVENTOR.
PATRICK E. LANNAN

United States Patent Office 3,158,337
Patented Nov. 24, 1964

3,158,337
CONTROL SYSTEM FOR SPACE DEVICE
Patrick E. Lannan, Parma Heights, Ohio, assignor, by mesne assignments, to International Resistance Company, Philadelphia, Pa., a corporation of Delaware
Filed May 28, 1959, Ser. No. 816,504
8 Claims. (Cl. 244—14)

This invention relates to a control system for a space-traveling device and, while it is of general utility, it is of particular utility in controlling or minimizing the pitch and roll of an artificial earth satellite after orbital boost.

One of the problems involved in maintaining an artificial earth satellite in its orbit and for obtaining therefrom information of various kinds has to do with the pitch and roll of the device in its travel about the earth. It is desirable that a satellite of the type under consideration travel in its orbit without rotation about an axis or axes within itself. Thus, with respect to a satellite traveling around the earth, the pitch constitutes an oscillation about a horizontal axis which is normal to the direction of travel. The roll, on the other hand, constitutes an oscillation about a horizontal axis which is parallel to the direction of travel. It is usually desired to stabilize the satellite so that the pitch and roll are minimized to the maximum extent. This is also true of a rocket which is intended to travel in a given path in outer space. The reason for this is that, unless the rocket is stabilized as to its pitch and roll at a predetermined point where it is to be launched on its path of space travel, a considerable error may result.

In prior art stabilizing devices of the general type under consideration here, use has been made of a gyroscope which is set at some time during the travel to provide the desired stabilization. Thus, for example, if an artificial earth satellite is intended to travel in its orbit at all times in a path which is perpendicular to the earth, a gyroscope is stabilized for this movement sometime after the satellite enters its orbit. However, it will easily be seen that since, generally speaking, the gyroscope tends to maintain a stable condition with reference to space, it will be necessary to provide a correction to the setting of the gyroscope continuously as the satellite travels around the earth in order to maintain the desired condition at all times with the true vertical line to the earth's surface. This correction, in the past, has generally been made by applying a pre-calculated correction which is generally found to be in error—at least to some degree—as time progresses. Also, since any errors introduced in this manner are cumulative, this may create a problem of considerable magnitude.

It is an object of the present invention to provide an improved device for determining the true vertical for a space traveling device which is orbiting a body such as the earth.

It is still another object of the invention to provide a control system for reducing the pitch and roll of a space traveling device to a minimum.

Still another object of the invention is to provide a control system for a space traveling device which includes means for scanning a body such as the earth with respect to which it is desired to exert a control on a given characteristic of the device.

In accordance with a particular form of the invention, a control system for a space-traveling device comprises a first scanning means for scanning with a radiant energy collector the horizon of an object such as the earth with respect to which a control signal is to be established. In accordance with a preferred embodiment of the invention, the radiant energy collector comprises a cylindrical mirror for collecting infra-red energy. It is adapted to receive at different times during its scan energy from a relatively small portion of the body, such as the earth, and a correspondingly small portion of space adjacent this body. The system also includes a second scanning means, for scanning simultaneously with the scanning of the first scanning means with a radiant energy collector having a scanning direction which is fixed with relation to that of the first scanning means. This second scanning means, in the preferred embodiment of the invention under consideration, includes a cylindrical mirror for collecting infra-red energy. The second scanning means is adapted to collect energy from a different portion of the horizon of the body being scanned, such as the earth, to receive energy at different times during its scan from a relatively small portion of the body and a correspondingly small portion of space adjacent the body.

The control system of the invention also includes means responsive to the time relationship between the simultaneous receipt by the first scanning means of energy from the object, such as the earth, and from space, and the simultaneous receipt by the second scanning means of energy from the object and from space for controlling a characteristic of the space traveling device. In a preferred embodiment of the invention, the characteristic which is controlled is the pitch of an earth satellite.

Also, in accordance with the invention, a second control system generally similar to the one just described can be used to control the roll of the satellite under consideration.

For a better understanding of the present invention, together with other and further objects thereof, reference is had to the following description taken in connection with the accompanying drawings, and its scope will be pointed out in the appended clamis.

Referring now to the drawings:

FIG. 1 is an illustration, partially in section, of a device in accordance with the present invention, which is useful for controlling a characteristic such as the pitch or roll of an earth satellite.

FIG. 2 comprises a block diagram circuit which is used in describing certain features of the device of FIG. 1.

FIG. 3 comprises a block diagram which is used to explain the pitch control features of the device of FIG. 1.

FIG. 4 comprises a block diagram which is utilized in explaining a protection feature of the FIG. 1 embodiment of the invention;

FIG. 5 comprises a diagram utilized to explain certain of the scanning features of the FIG. 1 embodiment.

FIGS. 7 and 8 are used to explain how certain control signals are derived in the FIG. 1 device.

FIG. 9 is a diagram used to illustrate another operating characteristic of the device of the invention.

Figure 1:
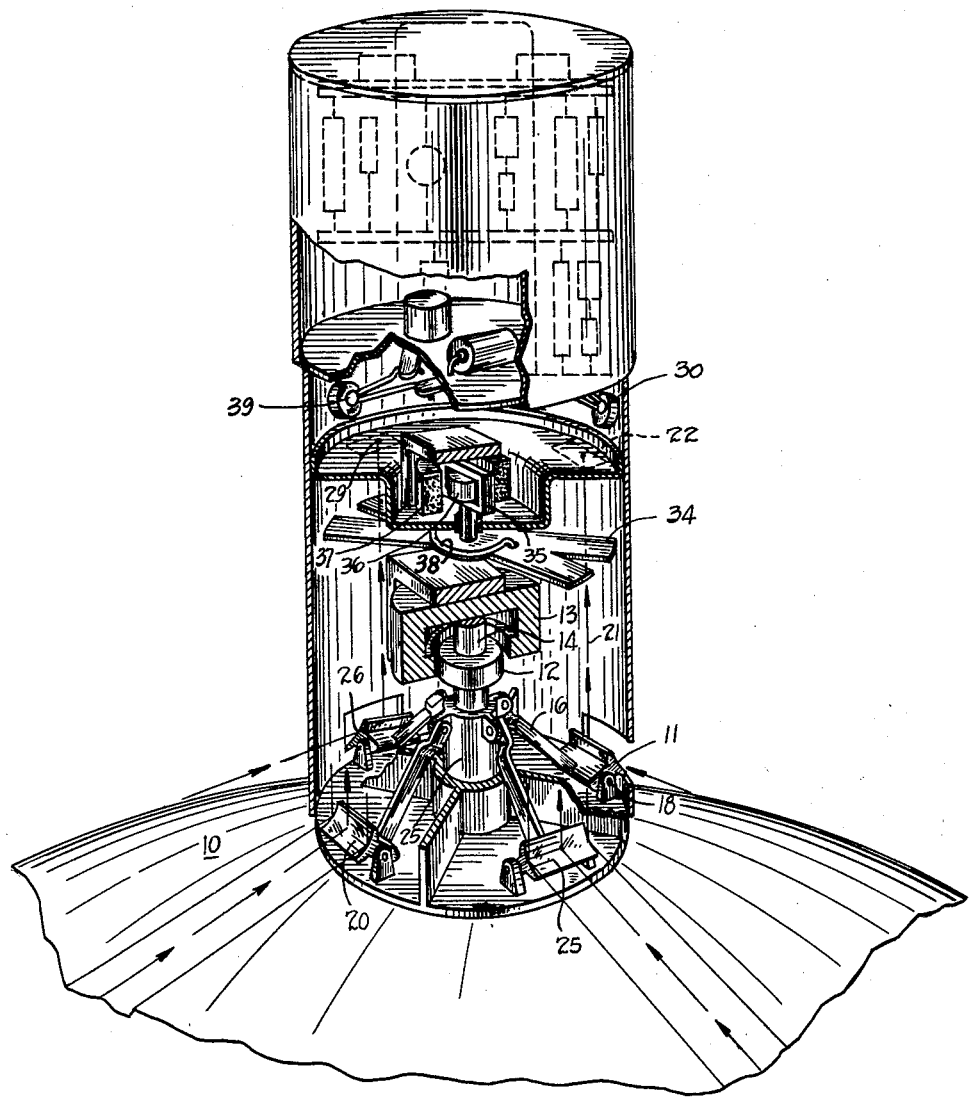

Referring now more particularly to FIG. 1, there is there shown a control system for a space-traveling device which is useful in controlling a characteristic of the device. Specifically, the FIG. 1 device is useful for controlling pitch and roll of an earth satellite in its travel in its orbit about the earth. Thus, in FIG. 1, the earth is represented by the numeral 10, and the control system includes a plurality of scanning means which are utilized to produce the desired control effects. One of these scanning means is indicated by the numeral 11, and it comprises a means for scanning with a radiant energy collector the horizon of the earth in order to derive energy from which a control signal can be established.

The cylindrical mirror 11, as will be described in more detail hereafter, is adapted to receive energy at different times during its scan from a relatively small portion of the earth and a correspondingly small portion of space adjacent the earth. In order to produce the desired scanning movement, a magnetic drive device is provided having a moving coil, which is indicated by the reference numeral 12. This moving coil has associated therewith a permanent magnet 13, and it is adapted to be moved rapidly up and down between the poles of the magnet 13 by an alternating current applied to the coil 12 from a source of electrical supply, which is not shown.

The movement of the coil 12 is transmitted through a linkage including the shaft 14, a cylinder 15 attached to the shaft, and an arm 16 to the mirror 11 which is mounted on pins, one of which is indicated by the reference numeral 18.

The device of FIG. 1 also includes a second scanning means, indicated by the reference numeral 20. This scanning means is generally similar to the one which has just been described. It is also operated in the manner which has just been described, by the coil 12, and thus scans simultaneously with the scanning of the first scanning means 11. The device 20 also constitutes a radiant energy collector for collecting infra-red energy and has a scanning direction which is fixed with reference to that of the scanning device 11.

In the case where the scanning devices 11 and 20 are utilized to control the pitch, the scanning device 11 may scan the horizontal ahead of the path of travel of the satellite, and the scanning device 20 may scan the horizon 180 degrees therefrom or, specifically, directly behind the satellite.

The device of FIG. 1 also includes a means responsive to the energy received by the mirrors 11 and 20 for controlling the pitch of the earth satellite. Thus, for example, radiant energy received by mirror 11 is reflected upward, along the line indicated by the arrow 21, to an energy-sensitive device or detector 22. The detector 22, in the embodiment shown, is a quartz-backed thermistor flake with a time constant of about two milliseconds and an area of about 25 square millimeters. Such devices are available commercially with a sensitivity of about 50–100 volts per watt at 25 cycles per second. Such devices have an equivalent noise input in the order of $10^{-8}$ to $10^{-9}$ watts. Calculations indicate that the energy which may be expected to be received by the reflector 11 will provide an energy level of at least $10^{-7}$ watts, when considering the radiation of the earth as a black body and an atmospheric transmission of 70% over the spectral range from 8–14 microns. This leads to an expected signal level which is 10 to 20 db over noise.

Similarly, an identical thermistor flake device is provided for the mirror 20. This is not shown in the figure because the portion which would include it has been cut away in the section illustrated.

The device of FIG. 1 also includes another control system including mirrors 25 and 26, which are adapted to scan the horizon of the earth in a line at right angles to the scanning of the horizon by mirrors 11 and 20. Mirrors 25 and 26 are constructed in the same manner as are mirrors 11 and 20, and are adapted to be driven in an identical manner by means of the oscillating coil 12. The thermistor flake device which is associated with mirror 26 is indicated by the reference numeral 29. It is generally similar to the thermistor flake device 22.

It will be understood that a corresponding flake device is provided for mirror 25 but that this is not illustrated in the drawing because it is included in the section which has been cut away.

A thermistor detector of the type illustrated in the drawing can easily be damaged by exposure to direct sunlight. For this reason, an arrangement has been provided in the device illustrated to shield each thermistor detector during such time as it might otherwise be exposed to the sun. In each case, the protecting device includes a thermocouple which is adapted to sense when the sun is in the direct view of any of the scanning mirrors 11, 20, 25 or 26. The thermocouple which protects flake 22 is indicated in FIG. 1 by the reference numeral 30. It is mounted adjacent the thermocouple 30 in the cover or can 31 which protects the apparatus. The thermocouple 30 is exposed to a field of view outside of the can 31 which is slightly larger than the field of view which is covered by mirror 11 in its complete scanning cycle.

Thus, before mirror 11 can ever be moved into a position where it would receive direct sunlight, the thermocouple 30 is exposed to direct light from the sun. The output of the thermocouple 30 is amplified and used to control a shutter 34, which is moved to block the path indicated by the arrow 21 and thus prevent direct sunlight received by the mirror 11 from impinging upon the thermistor detector 22.

In order to move the shield 34, a d'Arsonval type of meter movement is provided. This includes a coil 35 pivoted for movement in the magnetic field between magnets 36 and 37. A spring 38 is utilized to establish the normal or rest position of shutter 34, and currents provided by the thermocouple 30, after suitable amplification, are supplied to the coil 35 in order to move the shutter 34.

It will be understood that a similar thermocouple is provided for each of the other mirrors, the one provided for mirror 26 being indicated in FIG. 1 by the reference numeral 39.

It will also be understood that any of these thermocouples, for example, thermocouple 39, will, upon the receipt of direct sunlight, generate an electrical signal which, after amplification, is effective to move shutter 34 thus to cut off direct sunlight from the thermistor detector which the thermocouple is protecting.

The driving signal for the 25-cycle per second operation of the mirrors 11, 20, 25 and 26 is preferably derived from a 400-cycle secondary frequency standard, and from suitable frequency dividers which are included in the top portion of the can 31. Certain of the electrical components which may be included in the top portion of the can are indicated there by dotted lines. The path of movement of coil 12 needs only to be approximately one-thirty-second of an inch to provide a mirror deflection of 10 degrees for horizontal scanning.

It is estimated that a driving power to some 750 milliwatts maximum will be sufficient to drive the mirrors. A power source of this type can be provided in a manner understood by those skilled in the art by the use of grown-junction silicon power transistors. The thermocouples used, such as indicated by the reference numerals 30 and 39, can be of iron constantan, chromel-alumel, or copper constantan. The time constant of the thermocouple and amplifying circuit preferably has a value of 1–2 milliseconds to assure fast shutter closure. In the embodiment of the device here under consideration, the entire unit of FIG. 1 is only 2 3/16 inch in diameter and 5 1/4 inch long.

Figure 2:
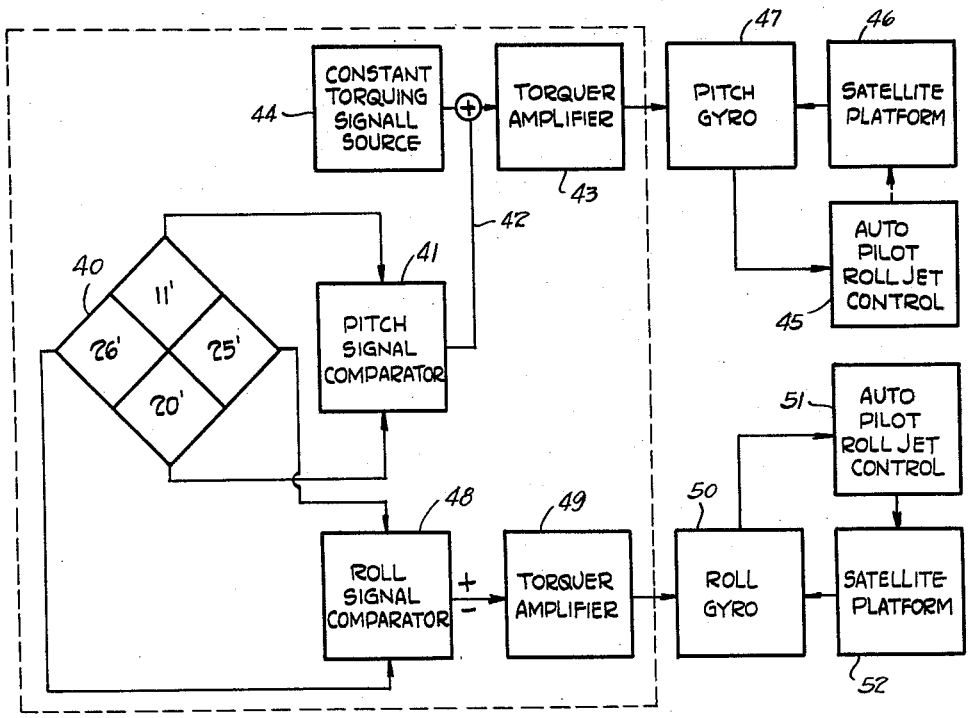

A block diagram for explaining a portion of the operation of the FIG. 1 device is indicated in FIG. 2. The horizon sensor, which includes the four scanning mirrors 11, 20, 25 and 26 of FIG. 1, is depicted in FIG. 2 as a as a four-quadrant sensing device, illustrated by the reference numeral 40. The pitch mirrors 11 and 20 of the FIG. 1 device are indicated in FIG. 2 by the reference numerals 11' and 20' respectively. The roll mirrors 25 and 26 of FIG. 1 are indicated in FIG. 2 by the reference numerals 25' and 26' respectively. The arrangement of FIG. 2 includes for the mirrors 11' and 20' a pitch signal comparator 41, the function of which is to compare the two signals derived from the energy from mirror 11' and mirror 20' and supply a control signal through conductor 42 to a control system, the first unit of which is a torquer amplifier 43. Also applied to the input of torquer amplifier 43 is a constant torquing signal derived from source 44. The output signal of the torquer amplifier 43 is supplied to a pitch gyro 47, which in turn controls an automatic pilot control device 45. The autopilot pitch jet control device 45 is effective to control the satellite platform 46 in such a manner as to minimize the pitching movements of the platform. Platform movements are fed back as a control to the pitch gyro so that there is no control signal to the pitch gyro 47 whenever no change is demanded by the torquer amplifier 43, and whatever changes are otherwise necessary have been effected by the satellite platform.

Similarly, the arrangement of FIG. 2 includes a roll signal comparator 48, a torquer amplifier 49, and a roll gyro 50 for controlling the roll of the satellite. These elements correspond respectively to elements 41, 43 and 47 of the pitch control system. Similarly, an autopilot roll jet control 51 is provided which corresponds generally to the unit 45 of the pitch control system. The satellite platform, for the purpose of considering the roll control system, is indicated by the reference numeral 52.

The arrangement of FIG. 2 is such that infra-red energy received from the earth's surface will, as an example, be reflected into infra-red detectors indicated for pitch control purposes by reference numerals 11' and 20'. Deviation in the pitch signals received indicating an apparent dip of the horizontal plane of the satellite platform will provide control input signals for torquer amplifier 43 through the comparator 41. The control output currents from torquer amplifier 43 provide control signals through the pitch gyro 47 to the autopilot pitch jet control 45, which then operates a cold gas jet to reorient the satellite platform 46 in the direction called for by the error signal received from torquer amplifier 43. The horizon sensor is capable of maintaining the declination angle of the horizon plane to within plus or minus one degree to control the pitch of the satellite in its orbit.

Two signals may simultaneously be sent to the torquer amplifier 43. One of these, of course, is obtained from the constant torquing signal source 44. This is intended to provide a signal which controls the average pitch declination to compensate for the average angular velocity of the orbit. The normal horizon sensor including the output from pitch signal comparator 41, therefore, normally only provides small error signal currents or vernier control to the constant error rate input provided for torquer amplifier 43 from constant torquing signal source 44. This has the result of reducing the sensitivity requirements for the pitch signal comparator 41 and its associated elements, in terms of the torquing rate per milliradian error. Alternatively, constant torquing signal source 44 can be omitted entirely, and the entire control for maintaining the pitch stabilizer of the system can be derived from the pitch signal comparator 41.

The pitch gyro 47 can be of a type which is available commercially. Additional details relating to the energy which is received by the four-quadrant sensors 11', 20', 25', and 26' of FIG. 2; the detection of this energy; its reduction to quadrant-sensitive error signals, and the subsequent derivation of polarity sensitive gyro torquing currents, are given hereinafter.

Figure 3:
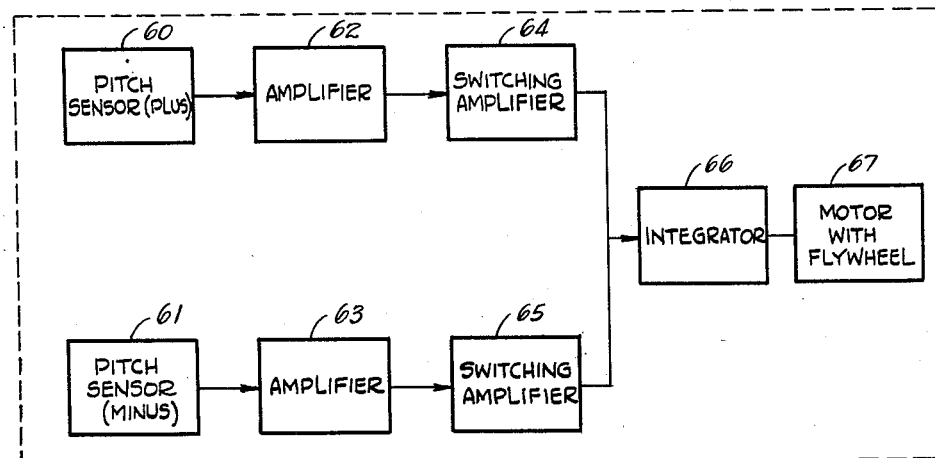

The block diagram of a suitable pitch control circuit is shown in FIG. 3. Thus, there is there shown a pitch sensor 60 and a pitch sensor 61, the first being designated by the legend plus and the second being indicated by the legend minus. These legends are chosen simply to distinguish one pitch sensor from the other. The device 60 may, for example, be a pitch sensor which drives a control signal looking forward in the path of satellite travel, and the device 61 may be a corresponding device looking aft. An amplifier 62 is coupled to pitch sensor 60, and an amplifier 63 is coupled to a pitch sensor 61. A switching amplifier 64 is coupled to amplifier 62, and a switching amplifier 65 is coupled to amplifier 63. The output of switching amplifiers 64 and 65 are connected to an integrator 66. A motor 67, with a flywheel attached, is adapted to be driven by the output of integrator 66.

As stated above, the pitch sensor 60 is responsive to the forward looking pitch quadrant sensor, and the pitch sensor 61 is responsive to the pitch quadrant sensor looking at the horizon behind the satellite. The pitch sensor 60 may be represented by the mirror 11 and thermistor flake 22 of FIG. 2 or by the quadrant senser 11' of FIG. 2, for example. The magnitude of the bias voltage will depend upon the peak voltage reading of the thermistor selected. It is desirable to apply as large a biasing voltage as possible, since the signal-to-noise ratio is proportional to the bias voltage. The output of each thermistor sensor 60, 61, respectively, is applied to an amplifier. The outputs of the switching amplifiers 64 and 65 are effective, in a manner which will be described in more detail hereinafter, to provide a differential signal in the integrator 66 which has an amplitude dependent upon the relative amplitude of the signal sensed by the sensors 60 and 61 and a polarity which is dependent upon whether pitch sensor 60 provides a greater signal output than does pitch sensor 61. The differential signal to integrator 66 is therefore proportional to the pitch error. A pitch error signal of one degree can provide a 5% change in the integrated D.C. voltage output from integrator 66. The output of the integrator 66, therefore, provides a voltage such as that derived from the opposing quadrant sensors 11' and 20' of FIG. 2. The integrated voltage output from integrator 66 can, therefore, provide a positive or negative torquing signal output for the motor device 67. The torque generated by the motor 67 is effective to exert the necessary pitch control on the satellite platform. It therefore conforms in function to the pitch jet control of FIG. 2. The motor 67 has been illustrated in FIG. 3, although it will be understood that the control exercised by the integrator 66 can be done through jets or by any other suitable means, if desired.

Figure 4:
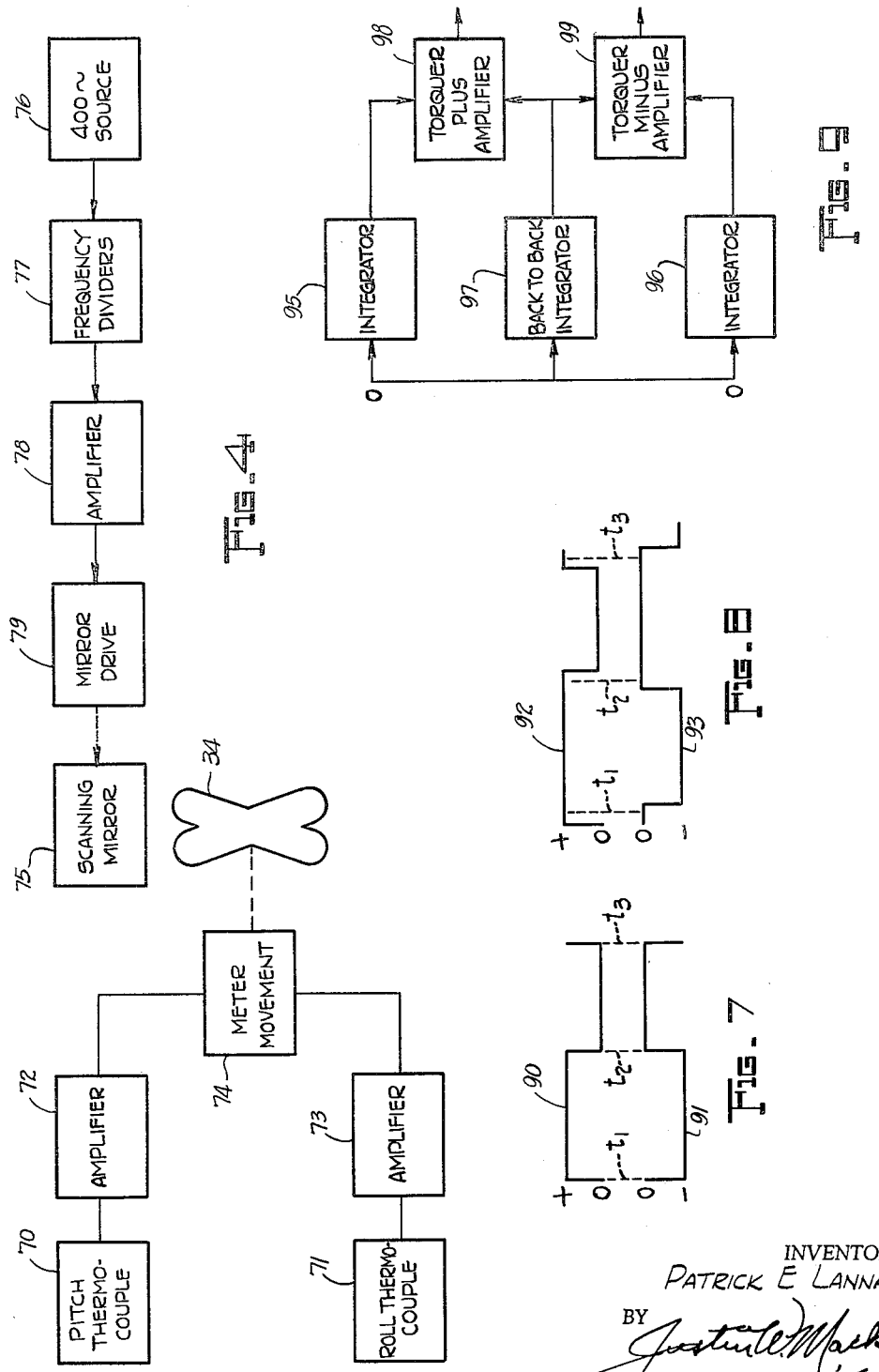

The block diagram of FIG. 4 is used for explaining the operation of the shutter arrangement of the FIG. 1 device. Thus, one of the pitch thermocouples, for example thermocouple 30, of FIG. 1, is indicated in FIG. 4 by the reference numeral 70. One of the roll thermocouples, for example thermocouple 39 of FIG. 1, is indicated by the reference numeral 71. An amplifier 72 is connected to the pitch thermocouple 70 and an amplifier 73 is coupled to the roll thermocouple 71. The output signals of the amplifiers 72 and 73 are supplied to the d'Arsonval meter movement which includes coil 35 of FIG. 1. This is indicated in FIG. 4 by the reference numeral 74. The shutter 34 of FIG. 1 is indicated by the same reference numeral in FIG. 4.

One of the scanning mirrors, for example scanning mirror 11, is indicated in FIG. 4 by the reference numeral 75. As previously explained, this scanning mirror is driven from a 400-cycle source, indicated in FIG. 4 by the reference numeral 76. The necessary frequency dividers to obtain 25 cycles per second are indicated by the reference numeral 77. The signal output from frequency divider 77 is applied through an amplifier 78 to the scanning mirror drive system 79, which in FIG. 1 includes the coil 12. Any of the thermocouples, for example thermocouple 70 of FIG. 4, is effective to detect the presence of the sun in the field of view of the detector which it is to protect. Each thermocouple is insulated from the shield 31 (FIG. 1) to prevent premature actuation due to the heat of the shield, and will be actuated only when the direct rays of the sun passing through the aperture in the can 31 causes the thermocouple itself to be heated. The output of the thermocouple 70, for example, will be amplified by amplier 72 sufficiently to provide a torquing current for the d'Arsonval meter movement coil which will turn the shutter 34 to cover the thermistor detector involved.

In the arrangement illustrated in FIG. 1, the detectors of the pitch and roll sensing systems are shaded by the shutter 34 to maintain a balanced system. The proper direction of rotation of the shutter shaft must be provided. Thus, if one direction of movement of the shutter shaft is effective to shade the pair of pitch sensing detectors, the other direction of movement is effective to shade the pair of rolled sensing detectors. Suitable mechanical stops are provided to limit the degree of movement to prevent overshooting the desired position.

Figure 5:
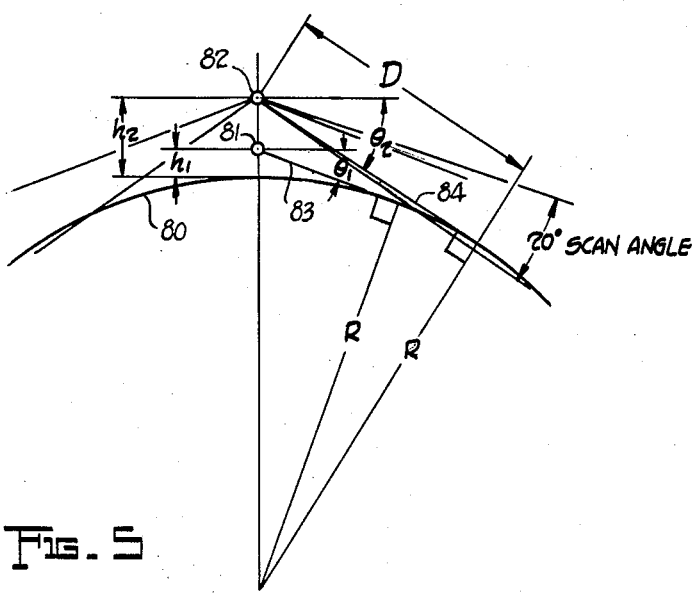

Reference is made to FIG. 5 for a more complete description of the scanning action which is provided by the FIG. 1 device. Thus, in FIG. 5 the earth is indicated by the reference numeral 80, while the reference numeral 81 indicates the satellite at one position $h_1$, 200 miles above the earth, and the reference numeral 82 indicates the satellite at another position $h_2$, 600 miles above the earth. Taking the case where the satellite is 200 miles above the earth, or at position 81 of FIG. 5, the angle of the line of sight to the horizon 83 is indicated by the reference character $\theta_1$. $\theta_1$ in FIG. 5 is 17.8° below the horizontal. The line of sight 84 to the horizontal, at the maximum altitude of 600 miles, as indicated by $\theta_2$ in FIG. 5, is 29.7° below the horizontal.

Figure 6:
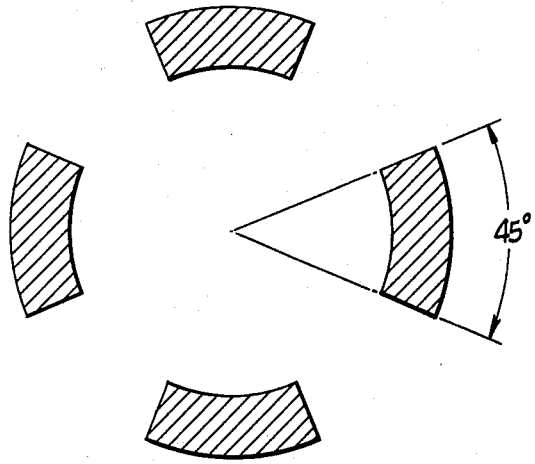
FIG. 6 is a diagram utilized to explain certain other scanning features of the FIG. 1 device.

In a particular design of an embodiment of the invention of the FIG. 1 arrangement, the device was designed to cause the mirrors, for example mirror 11 of FIG. 1 to include these two angles and to be a total of about 20° in vertical width, as indicated in FIG. 5. The beam provided by the cylindrical mirrors 11, 20, 25, and 26 is fan-shaped and was designed to include an observation angle of 45° on the circle formed on the horizon by the four respective horizontal sensors looking down on the earth, as indicated in FIG. 6. The total horizontal area observed by each detector is dependent upon the altitude of the satellite. An observation or scanning angle of 20 vertical degrees provides about 4° on either side of the minimum and maximum tangent angles. Therefore, at the minimum altitude of the satellite represented by position 81 in FIG. 5, 16° of the sensor will intercept the earth, while 4° will be directed into outer space over the horizon. At the maximum altitude indicated by the position 82 of FIG. 5, 16° of the sensor will be directed into outer space over the horizon.

The total energy received from the earth will, of course, depend on the area of the earth included in the sensing beam. It will therefore be a function of the satellite's altitude. Since the total energy emitted from a black body radiator varies as the fourth power of the absolute temperatures, the energy received by the detectors, looking in opposite directions, which geographic area is separated by a latitude difference of about 60° (a condition that may exist at 600 miles altitude) could be considerably different. If a method of simply comparing the peak signal received from each of two equal areas were used as a criterion for determining the pitch and roll declination errors, the minimum temperature difference of the two areas could easily produce a prohibitive error. The device of the invention therefore is made to provide a horizon sensing which is independent of the absolute energy level received at the detectors. In order to accomplish this, the mirrors 11, 20, 25, and 26 are designed to have a relatively narrow (for example 2°) vertical field of view, as seen by the detector. The mirrors are then swept or scanned through an angle of about 20°, thereby to cover the angle necessary to scan the horizon under the conditions depicted in FIG. 3, where at one position the satellite may be at an altitude of 200 miles and at another position, it may be at an altitude of 600 miles. The line of sight for the two altitude extremes assumed is, as stated above, 17.8° and 29.7° below the horizontal, and a vertical scanning of the beam is required which is sufficient to cover the area from 14° to 34° below the horizontal. Thus, the coil system 12 (FIG. 1) is designed to effect this required scanning operation and, under the conditions assumed, a pulse-modulated signal is received by each detector. The leading edge of an energy signal thus may indicate a change from the field of view representing a space background to an earth background. Similarly, the trailing edge of the energy signal may represent the reverse condition. Thus, any deviation of the chosen satellite vertical axis from the desired location appears at the output of the detectors as a pulse width difference. The pulse width difference sensing circuits and associated control circuits are used to effect the desired control.

Reference is made to FIG. 8 for a more detailed consideration of the operation just described. Thus, if the control arrangement of FIG. 1 is assumed to be absolutely vertical in its position above the earth, the curve 90 can represent the signal output of scanning mirror 11 under one condition of operation. Thus, the amplitude of the signal between times $t_1$ and $t_2$ can indicate the signal which is received as a result of mirror 11 looking into space and the signal amplitude between times $t_2$ and $t_3$ can indicate the signal received when the mirror 11 is receiving energy from the earth's surface. If the housing 31 is directly vertical, the signal received by mirror 20 can be as represented by curve 91. In other words, during the interval $t_1$ and $t_2$, the mirror 20 also receives energy from space, and during the interval $t_2$ and $t_3$, the mirror 20 receives energy from the earth. As pointed out above, the amplitudes of these signals may vary because of the amount of energy radiated from different portions of the earth's surface. By means of the circuit arrangement of FIG. 3, the switcher amplifiers 64 and 65 can in either case be made to be effective to provide signals, as indicated in FIG. 7, which have exactly the same amplitude no matter what part of the earth's surface is being scanned. Under these conditions, the average amplitude of the signal represented by the curve 90 is exactly equal to the average amplitude of the signal represented by the curve 91. Thus, any signal received from the integrator, for example integrator 66 of FIG. 3, would be ineffective to exert a control on the satellite platform. On the other hand, if there is a pitch error in the satellite platform, the effect will be to provide signal outputs, as indicated in FIG. 8 by the curves 92 and 93. In other words, the effect of a pitch error constituting a declination of the satellite platform in the forward direction would be to cause the mirror 11 to receive signals from space sometime before the time $t_1$ and to continue to receive signals from space some time after the time $t_2$, as indicated by curve 92. Correspondingly, the mirror 20 would receive signals from the space sometime after the time $t_1$ and would continue to receive them until sometime before the time $t_2$. The resultant signal output from the two pitch sensors would then be as indicated in FIG. 8. In other words, the average amplitude of the signal represented by curve 92 would become considerably greater than the average amplitude of the curve represented by the curve 93. Therefore, referring to FIG. 3, it will be seen that the integrator 66 would provide an output effective to exert a pitch control of the proper sense on the satellite platform.

In FIG. 9 there is shown a block diagram of a circuit which may be used in place of a portion of the circuit of FIG. 3. Thus the circuit of FIG. 9 includes an integrator 95 which can be connected to the output of switching amplifiers 64 of FIG. 3 and a second integrator 96 which can be connected to the output of switching amplifier 65. Each switching amplifier is also connected to the input circuit of a back-to-back integrator 97. The output circuits of integrators 95 and 97 are connected to a torquer plus amplifier 98 and the output circuits of integrators 96 and 97 are connected to a torquer minus amplifier 99. The output signals from the amplifiers 98 and 99 are used to control the pitch of the satellite in the proper sense in any suitable manner, for example, by one of those described above.

In considering the operation of the FIG. 9 arrangement, it will be seen that, since the scanning beam intercepts the earth for a greater length of time at lower altitudes, the D.C. integrated voltage will be altitude sensitive. It is inversely proportional to the altitude. The differential voltages between the two integrated D.C. levels is therefore proportional to pitch error. To compensate for the varying D.C. level of each integrated signal due to the effectively decreasing pulse duty, the back-to-back integration 97 is provided. The output from integrator 97 therefore represents a voltage derived from opposite quadrant pulse widths and is inversely proportional to the altitude of the satellite. This signal is used to control the gain of amplifiers 98 and 99. This causes the same control information to amplifier 98, for, say, a one degree deviation, to provide the same control effect on the satellite platform for low altitudes as for high altitudes.

It will be seen, therefore, that the arrangement just described comprises a first scanning means, for example, mirror 11, for scanning with a radiant energy collector (mirror 11 is a radiant energy collector), the horizon of a body (the earth) with respect to which a control signal is to be established. The mirror 11 is adapted to receive energy at two different times during its scanning cycle (1) from a relatively small portion of the body or earth being scanned and (2) from correspondingly small portion of space adjacent the earth.

Similarly, the mirror 20 constitutes a second scanning means for scanning simultaneously with the scanning of the first scanning means (mirror 11) with a radiant energy collector having a direction which is fixed with relation to that of the first scanning means or mirror 11. As illustrated in FIG. 1 and as described above, the mirror 11 scans directly before the satellite path, and the mirror 20 scans the horizon directly behind the satellite path. Again mirror 20 is adapted to receive energy at different times during its scanning cycle from (1) a relatively small portion of the earth, and (2) from a correspondingly small portion of space adjacent the earth. The control arrangement described and illustrated, for example in block form in FIG. 3, comprises a means responsive to the time relationship between the simultaneous receipt by the scanning mirror 11 of energy from the earth and from space, and the simultaneous receipt by the second scanning means or mirror 20 of energy from the earth and from space for controlling a specific characteristic of the satellite. In other words, the two mirrors under consideration are effective in a system which controls the position variations of one axis of the satellite. It will be apparent from FIG. 7 that at the time $t_2$, when the curve 90 goes from a maximum amplitude to a minimum amplitude, the mirror involved is simultaneously receiving energy from the body and from space.

While the angle subtended by the length of the mirror is indicated in FIG. 6 as being 45°, it will be understood that this length is not critical to a large degree.

While there have been described what are presently considered to be the preferred embodiments of this invention, it will be obvious to those skilled in the art that various changes and modifications may be made therein without departing from the invention, and it is therefore aimed to cover all such changes and modifications as fall within the direct spirit and scope of the invention.

What I claim is:

1. A scanning system for use in the control of the attitude of a space-travelling device comprising: a first scanning means including a radiant energy collector for scanning independently of the motion of said device the horizon of a body with respect to which a control is to be established to receive energy at different times during said scan from a relatively small portion of said body and a correspondingly small portion of space adjacent said body; a second scanning means including a radiant energy collector having a scanning direction which is fixed with relation to that of said first scanning means for scanning independently of the motion of said device a different portion of the horizon of said body to receive energy at different times during said scan of said second scanning means from a relatively small portion of said body and a correspondingly small portion of space adjacent said body; means for simultaneously operating said first scanning means and said second scanning means; and means responsive to the time relationship between the simultaneous receipt by said first scanning means of energy from said body and from space and the simultaneous receipt by said second scanning means of energy from said body and from space for operating means to control the attitude of said device.

2. A scanning system in accordance with claim 1 in which the scanning direction of the second scanning means is 180 degrees apart from the scanning direction of the first scanning means.

3. A scanning system in accordance with claim 1 in which the first and second scanning means each includes a separate cylindrical mirror for scanning the body and space adjacent to the body and for directing the radiant energy received from the body and the space to the radiant energy collector of the respective scanning means.

4. A scanning system in accordance with claim 3 in which each of the cylindrical mirrors has an energy-collecting angle in the scanning direction which is only a small portion of the total scanning angle of the mirror.

5. A scanning system in accordance with claim 1 including an energy collecting means oriented in the same direction as one of the scanning means and subtending a greater angle than said one of the scanning means for collecting energy from the sun, and means responsive to said energy collected from the sun for protecting the radiant energy collector of the said one of the scanning means from receiving energy directly from the sun.

6. A scanning system in accordanc with claim 5 in which the protecting means includes a shutter movable between the radiant energy collector of the said one of the scanning means and the sun.

7. A scanning system in accordance with claim 1 in which the means for simultaneously operating the first and second scanning means is a cyclic drive means for operation at a relatively high speed.

8. A scanning system in accordance with claim 1 including third and fourth scanning means similar to said first and second scanning means respectively for scanning different portions of the horizon of the body than that scanned by said first and second scanning means, and for operating means to control a second directional attitude of the device.

References Cited in the file of this patent

UNITED STATES PATENTS 2,828,930   Herbold _____ Apr. 1, 1958

OTHER REFERENCES

McCartney: "Horizon Scanning for Atmospheric Reentry," Advances in Astronautical Sciences, V4 (Proceedings of the AAS, November 1958), 1959, pp. 86–97.